Patented Oct. 13, 1953

2,655,548

UNITED STATES PATENT OFFICE 2,655,548

NEW UNSATURATED CARBINOLS AND PROCESS FOR PREPARING SAME

Ronald Major Evans, Ickenham, and John Harold Chapman, Ruislip, England, assignors to Glaxo Laboratories Limited, Greenford, England, a British company No Drawing. Application June 21, 1951, Serial No. 232,862. In Great Britain July 5, 1950

15 Claims. (Cl. 260—631)

This invention is concerned with improvements in or relating to the preparation of new unsaturated carbinols of the general formula

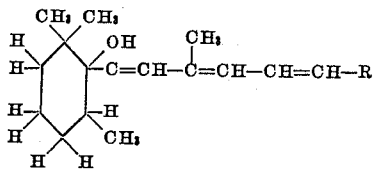

where R is one of the following groups:

or

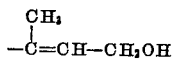

which compounds are of use in the synthesis of vitamin A and related compounds.

We have found that the new carbinols can be prepared by the partial reduction of carbinols of the general formula

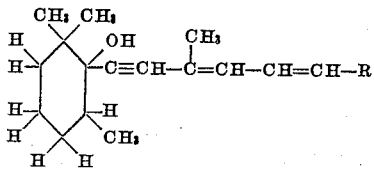

where R has the above stated meaning. The reduction of the acetylenic linkage to an ethylenic linkage in compounds of this type is a matter of considerable difficulty.

Chanley and Sobotka (J. A. C. S., 1949, 71, 4140) have reported the partial reduction of the acetylenic linkage in 1-(1'-cyclohexenyl)-1-butyn-3-ol represented by the following structural formula

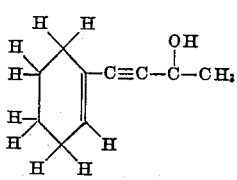

using lithium aluminium hydride as reducing agent. Experiments we have carried out using the same reagent on similar compounds having a longer carbon side-chain and methyl groups on the 2':6':6'- positions of the ring, have so far failed. We find however that where the compound has methyl groups in the 2':6':6'- positions and a hydroxyl group in the 1'-position, an acetylenic bond in the above position in the side chain can be reduced by means of lithium aluminium hydride.

The new carbinols may therefore be prepared by the action of lithium aluminium hydride on the corresponding acetylenic carbinols; the metal complexes produced by this reaction can readily be decomposed by means of water, preferably iced, to yield the desired carbinols.

Accordingly the invention comprises new carbinols of the general formula

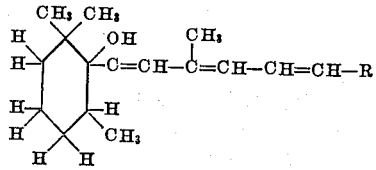

where R is

or

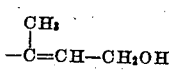

According to a further feature of the invention the stated new carbinols are prepared by reacting compounds of the general formula

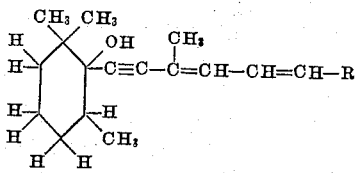

with lithium aluminium hydride in the presence of an inert organic solvent and decomposing the resulting complex with water, preferably iced.

As inert organic solvents, various solvents may be used which are inert to the reactants and products of the reaction but we prefer to use diethyl ether; cyclic aliphatic ethers such as dioxan and tetrahydrofuran are also satisfactory. Higher alkyl ethers such as diisopropyl ether or di-n-butyl ether are not particularly satisfactory owing to the poor solubility of lithium aluminium hydride in such solvents; this difficulty may however be overcome for example by introducing the lithium aluminium hydride in solution in another solvent, for example diethyl ether.

The reaction of the acetylenic carbinols with lithium aluminium hydride is preferably carried out at a temperature within the range of from 20–80° C. in the presence of an inert atmosphere. We prefer to use from 1.0–2.0 moles of reducing agent for each mol of acetylenic carbinol.

The decomposition of the metallic complexes obtained is preferably carried out by means of ice and water and the metal hydroxides rendered soluble by means of an acid, preferably an organic acid such for example as tartaric acid. Alternatively the decomposition may be effected by means of a strong alkali, for example caustic soda. The product can then be readily separated by means of extraction with a suitable organic solvent and purified by distillation and/or chromatography.

It is preferable to add a small quantity of an anti-oxidant for example, α-tocopherol before decomposition of the metallic complex. It is also preferable to carry out the whole reaction in an inert atmosphere, for example in an atmosphere of nitrogen.

As far as we are able to ascertain at the present time the new compound 6-methyl-8-(1'-hydroxy-2':6':6'-trimethylcyclohexyl)-octa-3:5:7-trien-2-ol has the following characteristics:

Boiling point, 135° C./10$^{-4}$ mm.
$n_D^{16}$ 1.5530
Light absorption (n-hexane):

Max. 265, 274, 285 m$\mu$
$\epsilon$ 23,400, 28,200, 22,400

We have found that 3:7-dimethyl-9-(1'-hydroxy-2':6':6'-trimethylcyclohexyl)-nona-2:4:6:8-tetraen-1-ol exists in three isomeric forms which have the following characteristics:

(a) M. P. 66–69° C.
Light absorption (n-hexane):

Max. 230, 308, 323 m$\mu$
$\epsilon$ 5,500, 51,400, 40,100

Inflections:

279–284 and 292–301 m$\mu$
$\epsilon$ 23,100 and 38,800

This isomer appears to be meta stable.
(b) M. P., 139° C.
Light absorption (ethanol):

Max. 227, 295, 308, 322 m$\mu$
$\epsilon$ 6,500, 39,500, 52,700, 51,000

(c) M. P. 69–71° C.
Light absorption (ethanol):

Max. 228, 308, 322 m$\mu$
$\epsilon$ 6,200, 51,100, 39,700

The starting material for the preparation of 3:7-dimethyl-9-(1'-hydroxy-2':6':6'-trimethylcyclohexyl)-nona-2:4:6:8-tetraen-1-ol also exists in two isomeric forms M. P. 81° C. and 155–8° C. respectively (see the copending application of Ronald Major Evans et al., Serial No. 199,150, filed December 4, 1950) and we have found that the use of the isomer of the starting material of M. P. 81° C. leads to the formation of the two isomers (a) and (b) above referred to. The use of the isomer of the starting material of M. P. 155–8° C. appears to lead to the formation of one isomer only, namely isomer (c) above. We wish it to be clearly understood that the isomerism above referred to is not structural isomerism and that the three new isomers (a), (b) and (c) above referred to all have the same structure and are all convertible to vitamin A. At present we prefer to prepare the isomers (a) and (b).

The starting materials used in the present process may be prepared by any convenient method. We prefer to prepare 6-methyl-8-(1'-hydroxy-2':6':6'-trimethylcyclohexyl)-octa-3:5-dien-7-yn-2-ol by the method described in the copending application of Ronald Major Evans, Serial No. 176,912, filed July 31, 1950, now Patent No. 2,622,103; 3:7-dimethyl-9-(1'-hydroxy-2':6':6'-trimethylcyclohexyl)-nona-2:4:6-trien-8-yn-1-ol may for example be prepared as described in said copending application No. 199,150 above mentioned.

In order that the invention may be well understood the following examples are given only as illustrations:

In the following examples all reductions were carried out using scrupulously dry material and in an atmosphere of dry nitrogen. The lithium aluminium hydride was measured as a standardised solution in ether or tetrahydrofuran. A trace of α-tocopherol was added to the products before working up.

EXAMPLE 1

6-methyl-8-(1'-hydroxy-2':6':6'-trimethylcyclohexyl)-octa-3:5-dien-7-yn-2-ol (5 g.) dissolved in dry ether (250 c. c.) was added over a period of 15 minutes to a stirred solution of lithium aluminium hydride (1.4 g.) in dry ether (250 c. c.). The solution was refluxed with rapid stirring for three hours, cooled to 0° C. and decomposed by the addition of crushed ice (5 g.). A saturated solution of tartaric acid (100 c. c.) was added to the mixture. The ethereal layer was separated, washed with saturated sodium bicarbonate solution and the solution dried over anhydrous magnesium sulphate. Removal of the solvent and fractionation of the residue gave 6-methyl-8-(1'-hydroxy-2':6':6'-trimethylcyclohexyl)-octa-3:5:7-trien-2-ol (1.3 g.; 26%).

B. P., 110–130° C./10$^{-5}$ mm.
$n_D^{14}$ 1.5482
Light absorption (n-hexane):

Max. 276 m$\mu$; $E_{1cm}^{1\%}$ 899
$\epsilon$ 25,000

Unsaturation (platinum oxide) 3.04 $\vdash$. The infra-red spec. showed no absorption at 2230 cm.$^{-1}$.

EXAMPLE 2

6-methyl-8-(1'-hydroxy-2':6':6'-trimethylcyclohexyl)-octa-3:5-dien-7-yn-2-ol (5 g.) dissolved in dry ether (250 c. c.) was added over a period of 20 minutes to a stirred solution of lithium aluminium hydride (0.7 g.) in dry ether (250 c. c.). The solution was refluxed with rapid stirring for one hour, cooled to 0° C. and decomposed by the addition of crushed ice (5 g.). A saturated solution of tartaric acid (100 c. c.) was added to the mixture. The ethereal layer was separated, washed with saturated sodium bicarbonate solution and the solution dried over anhydrous magnesium sulphate. Removal of the solvent gave crude 6-methyl-8-(1'-hydroxy-2':6':6'-trimethylcyclohexyl)-octa-3:5:7-trien-2-ol (4.85 g.).

$n_D^{14}$ 1.5412

The above crude product (2.0 g.) was chromatographed on a column of de-activated alumina (1 inch diameter) using petroleum ether (B. P. 40–60° C.) as solvent and developer. When development had proceeded to a satisfactory stage, the column was extruded. The portion containing the required material, which showed characteristic fluorescence in U. V. light, was separated, the product removed by elution with ether and isolated in the usual manner to give 6 - methyl - 8-(1'-hydroxy-2':6':6'-trimethylcyclohexyl -octa-3:5:7-trien-2-ol (1.0 g.). $n_D^{14}$ 1.5384.

Light absorption (n-hexane):

Max. 272 mμ; $E_{1cm}^{1\%}$ 700
ε 19,500

EXAMPLE 3

3:7 - dimethyl - 9 - (1'-hydroxy-2':6':6'-trimethylclohex - 1' - yl - nona-2:4:6-trien-8-yn-1-ol (1.0 g.) dissolved in dry ether (50 ml.) was added to a stirred solution of lithium aluminium hydride (0.25 g.) in dry ether (50 ml.) during 1 hour. The mixture was then refluxed for 3 hours. All operations up to this stage were conducted in an atmosphere of nitrogen. The reaction mixture was cooled to 0° C. and decomposed by the addition of small pieces of ice. A saturated solution of tartaric acid was added and the ethereal layer washed with water and dried over magnesium sulphate. After evaporation the residual oil was crystallised from cyclohexane and gave 3:7-dimethyl-9-(1'-hydroxy-2':6':6'-trimethylcyclohex-1'-yl)-nona-2:4:6:8-tetraen-1-ol (200 mg.) M. P. 63° C. showing absorption in the ultra-violet (ethanol) max. 307 mμ;

$E_{1cm}^{1\%}$ 1465

(ε, 45,500), infil. 313–322 and 294–300 mμ;

$E_{1cm}^{1\%}$ 1121 and 1203

(ε, 34,000 and 36,000). It had negligible adsorption in the infra-red at 2230 cm.$^{-1}$.

EXAMPLE 4

A solution of 3:7-dimethyl-9-(1'-hydroxy-2':6':6' - trimethylcyclohex-1'-yl) nona-2:4:6-trien-8-yn-1-ol (3.5 g.) in ether (100 c. c.) was added during 15 minutes to a stirred solution of lithium aluminium hydride (0.66 g.; 1.5 mol.) in ether (100 c. c.). After being stirred at room temperature for 6 hours the mixture was cooled to 0° and treated with small pieces of ice. A saturated solution of tartaric acid was added, the ethereal layer extracted, washed with sodium bicarbonate solution, dried over magnesium sulphate and evaporated at reduced pressure. Crystallization of the residue from cyclohexane gave 3:7 - dimethyl-9-(1'-hydroxy-2':6':6'-trimethylcyclohex - 1' - yl) nona-2:4:6:8-tetraen-1-ol (0.9 g.) M. P. 127°, undepressed when mixed with an authentic sample. It showed no absorption in the triple bond region in the infra red (2230 cm.$^{-1}$).

EXAMPLE 5

A solution of 3:7-dimethyl-9-(1'-hydroxy-2':6':6'-trimethylcylohex - 1' - yl)nona-2:4:6:-trien-8-yn-1-ol (2.0 g. in ether (28 c. c.) was added during 15 minutes to a solution of lithium aluminium hydride (0.3 g.; 1.2 mols.) in ether (28 c. c.). The white suspension was stirred for 2 hours under reflux and then cooled while ice was added, followed by N-sulphuric acid. After being washed with sodium bicarbonate solution, the ether was dried over magnesium sulphate and evaporated under reduced pressure. Crystallisation of the residue from cyclohexane gave 3:7 - dimethyl-9-(1'-hydroxy-2':6':6'-trimethylcyclohex - 1' - yl)nona-2:4:6:8-tetraen-1-ol (0.9 g.), M. P. 130–132°, undepressed by an authentic sample.

EXAMPLE 6

A solution of 3:7-dimethyl-9-(1'-hydroxy-2':6':6'-trimethylcyclohex - 1' - yl)nona-2:4:6-trien-8-yn-1-ol (3.5 g.) in isopropyl ether (100 c. c.) was added during 20 minutes to a stirred solution of lithium aluminium hydride (0.66 g.; 1.5 mol.) in ether (35 c. c.) which had been diluted to 100 c. c. with isopropyl ether. After being boiled under reflux for ½ hour the cooled mixture was treated with small pieces of ice. N-sulphuric acid was then added, the ethereal layer was separated, washed with sodium bicarbonate solution, dried over magnesium sulphate and evaporated at reduced pressure. Crystallization of the residue from cyclohexane wave colourless crystals (1.9 g.) M. P. 86°. Absorption in the infra-red at 2230 cm.$^{-1}$ showed the presence of 60% of unreduced material.

EXAMPLE 7

A solution of 3:7-dimethyl-9-(1'-hydroxy-2':6':6'-trimethylcyclohex - 1' - yl)nona-2:4:6-trien-8-yn-1-ol (3.5 g.) in dioxan (100 c. c.) was added during ½ hour to a stirred solution of lithium aluminium hydride (1.66 g.; 1.5 mols.) in ether (30 c. c.) which had been diluted with dioxan (60 c. c.). After having been boiled for ½ hour the mixture was cooled and treated with pieces of ice, followed by N caustic soda solution. The mixture was extracted with ether which was then washed with water, dried over magnesium sulphate and evaporated at reduced pressure. Crystallization of the residue from cyclohexane gave 3:7 - dimethyl-9-(1'-hydroxy-2':6':6' - trimethylcyclohex-1'-yl)nona-2:4:6:8-tetraen-1-ol (0.69 g.) M. P. 139°, undepressed by an authentic sample. It showed no absorption at 2230 cm.$^{-1}$.

Example 8

A solution of 3:7-dimethyl-9-(1'-hydroxy-2':6':6'-trimethylcyclohex - 1' - yl)nona-2:4:6-trien-8-yn-1-ol (3.5 g.) in tetrahydrofuran (100 c. c.) was added during 20 minutes to a stirred solution of lithium aluminium hydride (0.44 g.; 1 mol.) in tetrahydrofuran (100 c. c.). After being boiled for ¼ hour the mixture was cooled and treated with pieces of ice followed by 2N sulphuric acid. The mixture was extracted with ether which was separated, washed with sodium bicarbonate solution, dried over magnesium sulphate and evaporated at reduced pressure. Crystallisation of the residue from cyclohexane gave 3:7 - dimethyl - 9 - (1' - hydroxy - 2':6':6' - trimethylcyclohex-1'-yl)nona 2:4:6:8-tetraen-1-ol (0.71 g.) M. P. 134°, undepressed by an authentic sample. It showed no absorption at 2230 cm.$^{-1}$.

EXAMPLE 9

A solution of 3:7-dimethyl-9-(1'-hydroxy-2'':6':6' - trimethylcyclohex-1'-yl)nona-2:4:6-trien-8-yn-1-ol (3.5 g.) in benzene (100 c. c.) was added during 15 minutes to a stirred solution of lithium aluminium hydride (0.44 g.; 1 mol.) in ether (25 c. c.) and benzene (75 c. c.). After being boiled under reflux for 1 hour the mixture was cooled and treated with ice followed by N-sulphuric acid. The organic layer was separated, washed with sodium bicarbonate solution, dried over magnesium sulphate and evaporated at reduced pressure. Crystallisation of the residue from cyclohexane gave 3:7-dimethyl-9-(1'-hydroxy - 2':6':6' - trimethylcyclohex-1'-yl)-nona-2:4:6:8-tetraen-1-ol (1.0 g.) M. P. 133°, undepressed when mixed with an authentic sample and it showed no absorption at 2230 cm.$^{-1}$.

EXAMPLE 10

A solution of lithium aluminium hydride (0.26 g.; 1.04 mol.) in ether (40 c. c.) was added during 10 minutes to a stirred solution of 3:7-dimethyl-9-(1'-hydroxy-2':6':6' - trimethylcyclohex-1'-yl)nona-2:4:6-trien-8-yn-1-ol (2.0 g.) in ether (60 c. c.). The white suspension was boiled for 1½ hours, then cooled and hydrolysed by ice followed by a saturated solution of tartaric acid. The ether layer was separated, washed with sodium bicarbonate solution, dried over sodium sulphate and evaporated at reduced pressure. Crystallisation of the residue from cyclohexane gave colourless crystals of 3:7-dimethyl-9-(1'-hydroxy-2':6':6' - trimethylcyclohex - 1'-yl)nona-2:4:6:8-tetraen-1-ol (0.95 g.) M. P. 70–74°, gradually recrystallising and then remelting at 125–7°. U. V. spectrum: inflexion 294–301 m$\mu$, $\lambda$ max. 307 and 320 m$\mu$;

$E_{1cm}^{1\%}$ 1279, 1600, 1200 respectively

EXAMPLE 11

6-methyl-8-(1' - hydroxy - 2':6':6' - trimethylcyclohexyl)-octa-3:5-dien-7-yn-2-ol (20.2 g.) in dry ether (500 c. c.) was added to a 2.09% ethereal solution of lithium aluminium hydride (167 c. c.; 1.25 mols.) over a period of 20 minutes. The mixture was stirred under reflux in nitrogen for 3 hours and then cooled to 0° and treated cautiously with ice, and tartaric acid (10 g.) in water (500 c. c.). The ethereal layer combined with a further ethereal extract of the aqueous phase was washed, dried (MgSO$_4$) and evaporated, yielding a pale yellow oil (19 g.).

Light absorption (n-hexane).—Max. at 241, 275, 313 m$\mu$;

$E_{1cm}^{1\%}$ 550, 615, 295 respectively

The crude material was dissolved in petrol (B. P. 40–60°; 50 c. c.) and chromatographed on Brockman grade III alumina (400 g.). The chromatogram was developed with petrol (300 c. c.) until the two yellow bands, fluorescent in ultra violet light, had reached the middle of the column. The portion of the column above these bands was eluted with ether and gave, on evaporation, a yellow oil (10.5 g.) which was stabilised by the addition of $\alpha$-tocopherol.

Light absorption (n-hexane).—Max. at 274 and 313 m$\mu$, $E_{1cm}^{1\%}$ 911 and 235 respectively Infra-red absorption analysis showed 91% reduction of the triple bond. A portion of this material (7.09 g.) was rechromatographed and the column cut and extracted as above. On evaporating the solvent 6-methyl-8-(1'-hydroxy-2':6':6' - trimethylcyclohexyl)octa - 3:5:7 - trien-2-ol (3.6 g.) remained as a colourless viscous gum, $n_D^{15}$ 1.5530. (Found: C, 77.9; H, 10.8. C$_{18}$H$_{30}$O$_2$ requires: C, 77.7; H, 10.8%. Light absorption (n-hexane): Max. 265, 274, 285 m$\mu$; $\epsilon$ 23,400, 28,200, 22,400 respectively. Active hydrogen (Zerewitinoff) 1.98 atoms of hydrogen per molecule. Unsaturation: 3.13 $\Gamma$ per molecule. The alcohol was distilled, B. P. 135°/10$^{-4}$ mm.

EXAMPLE 12

3:7-dimethyl-9-(1' - hydroxy - 2':6':6' - trimethylcyclohex-1'-yl)nona-2:4:6-trien - 8 - yn-1-ol (M. P. 81°, 3 g.) in dry ether (150 ml.) was added to a stirred solution of lithium aluminium hydride (40.3 ml. of 1.8% solution; 2 mols.) in dry ether (150 ml.) at room temperature in nitrogen during 1 hour. The mixture was refluxed for 3 hours, cooled to 0° and decomposed by the addition of small pieces of ice followed by saturated tartaric acid solution. The ethereal layer was washed with saturated tartaric acid solution and water and dried over anhydrous magnesium sulphate. Evaporation of the solvent gave an oil (2.8 g.).

Light absorption (alcohol).—Max. 233, 308, 323, 347 m$\mu$;

$E_{1cm}^{1\%}$ 274, 1084, 967, 358 respectively. ($\epsilon$ 8,300, 33,000, 29,400, 10,900). Inflection: 279–285, 292–300, 355–365 m$\mu$; $E_{1cm}^{1\%}$ 548, 825, 234 respectively. ($\epsilon$, 16,700, 25,100, 7,100.)

On treatment with cyclohexane 3:7-dimethyl-9-(1'-hydroxy - 2':6':6' - trimethylcyclohex - 1'-yl(nona-2:4:6:8-tetraen-1-ol crystallised M. P. 66–69°. Max. 230, 308, 323 m$\mu$;

$E_{1cm}^{1\%}$ 180, 1689, 1318 respectively. ($\epsilon$, 5,500, 51,400, 40,100). infl. 279–284, 292–301 m$\mu$; $E_{1cm}^{1\%}$ 758, 1273 respectively. ($\epsilon$, 23,100, 38,800.)

Recrystallisation from cyclohexane gave needles, M. P. 122–127°

Light absorption (alcohol).—Max. 230, 296, 307, 323 m$\mu$;

$E_{1cm}^{1\%}$ 186, 1430, 1907, 1533 respectively. ($\epsilon$, 5,700, 43,500, 58,000, 46,700.) Inflection: 282–287 m$\mu$; $E_{1cm}^{1\%}$ 840. ($\epsilon$, 25,600.)

Active hydrogen.—1.8.
Total hydrogenation.—3.6 double bonds (4% Pd/C in methanol).

EXAMPLE 13

3:7-dimethyl-9 - (1' - hydroxy - 2':6':6' - trimethylcyclohex-1'-yl)nona-2:4:6 - trien - 8 - yn-1-ol (M. P. 81°; 3.5 g.) dissolved in dry ether (175 c. c.) was added over a period of 15 minutes to a stirred solution of lithium aluminium hydride (0.88 g.) in dry ether (175 c. c.). The solution was refluxed for 2 hours, cooled to 0° C. and decomposed by the addition of crushed ice (1 g.) followed by N-sodium hydroxide (50 ml.). The ethereal layer was separated, washed twice with water, dried over anhydrous sodium sulphate. After evaporation of the ether the residual oil was crystallised from cyclohexane (14 ml.) and gave 3:7 - dimethyl-9-(1'-hydroxy-2':6':6':-trimethylcyclohex-1'-yl)-nona-2:4:6:8-tetraen - 1-ol (1.27 g.) M. P. 139° showing absorption in the ultra-violet (ethanol) maxima 227, 295, 308 and 322 m$\mu$, $E_{1cm}^{1\%}$ 251, 1444, 1955 and 1565, $\epsilon$, 6,500, 39,500, 52,700, and 51,000 respectively It showed no absorption in the triple bond region in the infra red (2230 cm.$^{-1}$). Found: C, 78.7; H, 10.5; C$_{20}$H$_{32}$O$_2$ requires: C, 78.95; H, 10.5%.

EXAMPLE 14

*3:7-dimethyl-9-(1'-hydroxy-2':6':6'-trimethylcyclohex-1'-yl)nona-2:4:6:8-tetraen-1-ol*

A solution of 3:7 - dimethyl - 9 - (1' - hydroxy - 2':6':6' - trimethylcyclohex - 1' - yl)-nona-2:4:6-trien-8-yn-1-ol (M. P. 155–158°; 2.0 g.) in ether (100 ml.) was added dropwise to lithium aluminium hydride (0.50 g.) in ether (100 ml.) and refluxed for 3 hours. The solution was cooled in ice and decomposed with ice and tartaric acid solution. The ethereal solution was washed with tartaric acid solution and water, and dried. The residue, after evaporation of the ether, was crystallised from cyclohexane (10 ml.) at 0° overnight. Yield 0.93 g.; M. P. 69–71°.

*Light absorption in ethanol.*—Max. at 228, 308, and 322 m$\mu$, $E_{1cm}^{1\%}$ 204, 1680, and 1304 respectively ($\epsilon$, 6,200, 51,100, and 39,700). Found: C, 78.93; H, 10.65%. $C_{20}H_{32}O_2$ requires: C, 78.93; H, 10.52%.

We claim:

1. As new compounds, compounds of the general formula

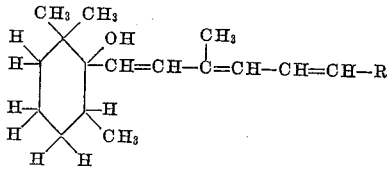

where R is selected from the group consisting of

and

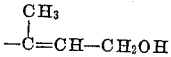

2. 6 - methyl - 8 - (1' - hydroxy - 2':6':6'- trimethylcyclohexyl) octa-3:5:7-trien-2-ol.

3. 3:7 - dimethyl - 9 - (1' - hydroxy - 2':6':6'- trimethylcyclohexyl)-nona-2:4:6:8-tetraen-1-ol.

4. A process for the preparation of compounds of the general formula

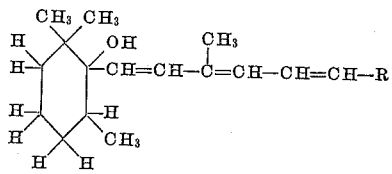

where R is selected from the group consisting of

and

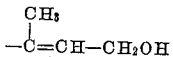

which comprises the steps of reacting a compound of the general formula

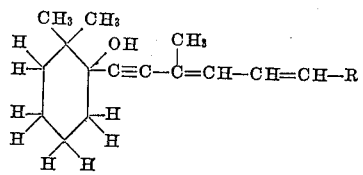

where R has the above-stated meaning with lithium aluminum hydride in the presence of an inert organic solvent and decomposing the resulting complex with water.

5. A process as claimed in claim 4 in which the inert organic solvent is selected from the group consisting of diethyl ether, dioxan and tetrahydrofuran.

6. A process as claimed in claim 4 in which the reaction is carried out at a temperature within the range of from 20° C. to 80° C.

7. A process as claimed in claim 4 in which from 1.0 to 2.0 moles of lithium aluminum hydride are used per mole of the compound reacted therewith.

8. A process for the preparation of compounds of the general formula

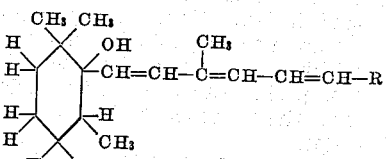

where R is selected from the group consisting of

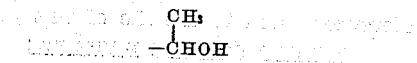

and $$-\underset{\underset{CH_3}{|}}{C}=CH-CH_2OH$$

which comprises the steps of reacting a compound of the general formula

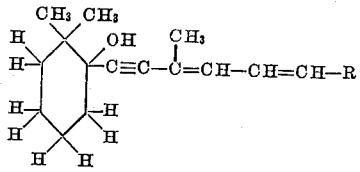

where R has the above-stated meaning with from 1.0 to 2.0 moles of lithium aluminum hydride per mole of said last-mentioned compound in the presence of an inert organic solvent at a temperature within the range of from 20° C. to 80° C. and decomposing the resulting complex with iced water.

9. A process as claimed in claim 8 in which the inert organic solvent is diethyl ether.

10. A process as claimed in claim 8 in which the said complex is decomposed in the presence of an acid.

11. A process as claimed in claim 8 in which the said complex is decomposed in the presence of tartaric acid.

12. A process as claimed in claim 8 in which the said complex is decomposed in the presence of a strong alkali.

13. A process as claimed in claim 8 in which the said complex is decomposed in the presence of caustic soda.

14. A process as claimed in claim 8 in which the said complex is decomposed in the presence of an anti-oxidant.

15. A process for the preparation of compounds of the general formula

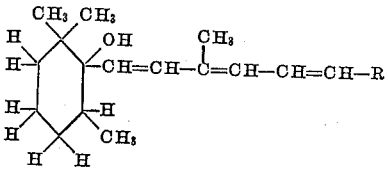

where R is selected from the group consisting of

and

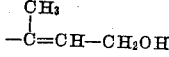

which comprises the steps of reacting a compound of the general formula

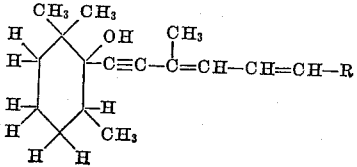

where R has the above-stated meaning with from 1.0 to 2.0 moles of lithium aluminum hydride per mole of said last-mentioned compound in the presence of an inert organic solvent at a temperature within the range of from 20° C. to 80° C. and decomposing the resulting complex with iced water in the presence of tartaric acid and an anti-oxidant.

RONALD MAJOR EVANS.
JOHN HAROLD CHAPMAN.

References Cited in the file of this patent

UNITED STATES PATENTS

| Number | Name | Date |
|---|---|---|
| 2,576,311 | Schlesinger | Nov. 27, 1951 |

OTHER REFERENCES

Nystrom et al., J. American Chem. Soc., vol. 69, pages 1197–1199, May 1947.

Nystrom et al., J. American Chem. Soc., vol. 69, pages 2548–2549, Oct. 1947.

Chanley et al., J. American Chem. Soc., vol. 71, No. 12, pages 4140–41, Dec. 1949.